United States Patent
Kim et al.

(10) Patent No.: US 8,006,158 B2
(45) Date of Patent: Aug. 23, 2011

(54) HYBRID AUTOMATIC REPEAT REQUEST METHOD IN A MOBILE COMMUNICATION SYSTEM AND TRANSMISSION/RECEPTION METHOD AND APPARATUS USING THE SAME

(75) Inventors: Yu-Chul Kim, Seoul (KR); Jung-Soo Jung, Seongnam-si (KR); Hwan-Joon Kwon, Hwaseong-si (KR); Dong-Hee Kim, Yongin-si (KR); Jae-Chon Yu, Suwon-si (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 1188 days.

(21) Appl. No.: 11/717,828

(22) Filed: Mar. 14, 2007

(65) Prior Publication Data
US 2007/0245202 A1 Oct. 18, 2007

(30) Foreign Application Priority Data
Mar. 14, 2006 (KR) .................................. 2006-23756

(51) Int. Cl.
*H04L 1/18* (2006.01)

(52) U.S. Cl. ........................................ 714/749; 714/748

(58) Field of Classification Search .................. 714/748, 714/749
See application file for complete search history.

(56) References Cited

U.S. PATENT DOCUMENTS

| | | | | |
|---|---|---|---|---|
| 7,155,236 B2 * | 12/2006 | Chen et al. | .................... | 455/454 |
| 7,200,115 B2 * | 4/2007 | Khan et al. | .................... | 370/236 |
| 7,447,968 B2 * | 11/2008 | Ha et al. | ........................ | 714/748 |
| 7,660,282 B2 * | 2/2010 | Sarkar | ........................... | 370/331 |
| 2003/0140298 A1 * | 7/2003 | Koprivica | .................... | 714/758 |
| 2004/0088634 A1 * | 5/2004 | Kim et al. | ..................... | 714/752 |
| 2004/0160914 A1 * | 8/2004 | Sarkar | ........................... | 370/329 |
| 2004/0223473 A1 * | 11/2004 | Ha et al. | ........................ | 370/335 |
| 2004/0266466 A1 | 12/2004 | Kim et al. | | |
| 2005/0030911 A1 * | 2/2005 | Tiedemann et al. | .......... | 370/278 |
| 2005/0030964 A1 * | 2/2005 | Tiedemann et al. | .......... | 370/431 |
| 2005/0041618 A1 * | 2/2005 | Wei et al. | ..................... | 370/328 |
| 2005/0047344 A1 * | 3/2005 | Seol | ............................. | 370/235 |
| 2006/0252445 A1 * | 11/2006 | Kim et al. | ..................... | 455/522 |

FOREIGN PATENT DOCUMENTS
WO  WO 2005/078976  8/2005

\* cited by examiner

*Primary Examiner* — M. Mujtaba K Chaudry
(74) *Attorney, Agent, or Firm* — The Farrell Law Firm, P.C.

(57) ABSTRACT

A Hybrid Automatic Repeat reQuest (HARQ) method performed in a receiver of a mobile communication system. The HARQ method includes receiving from a transmitter an initial transmission subpacket among a plurality of subpackets; sending a request for transmission of a retransmission subpacket to the transmitter upon failure to decode the initial transmission subpacket; receiving the retransmission subpacket using control information previously received from the transmitter upon failure to receive, from the transmitter, control information for reception of the retransmission subpacket; and receiving the retransmission subpacket using currently received control information upon receipt of the control information from the transmitter.

32 Claims, 13 Drawing Sheets

HYBRID AUTOMATIC REPEAT REQUEST METHOD IN A MOBILE COMMUNICATION SYSTEM AND TRANSMISSION/RECEPTION METHOD AND APPARATUS USING THE SAME

PRIORITY

This application claims priority under 35 U.S.C. §119(a) to a Korean Patent Application filed in the Korean Intellectual Property Office on Mar. 14, 2006 and assigned Serial No. 2006-23756, the disclosure of which is incorporated herein by reference.

BACKGROUND OF THE INVENTION

1. Field of the Invention

The present invention relates generally to a Hybrid Automatic Repeat reQuest (HARQ) technology in a mobile communication system, and in particular, to an HARQ method in a mobile communication system, capable of improving a data rate by minimizing use of resources, and a transmission/reception method and apparatus using the same.

2. Description of the Related Art

Generally, multiple access schemes of mobile communication systems are classified into Frequency Division Multiple Access (FDMA) in which a predetermined frequency band is divided into a plurality of channels and users use frequency channels uniquely allocated to them, Time Division Multiple Access (TDMA) in which one frequency channel is time-shared by a plurality of users (or subscribers), and Code Division Multiple Access (CDMA) in which a plurality of subscribers use the same frequency band at the same time but they perform communication using different codes uniquely allocated to them. With the rapid progress of communication technology, the mobile communication systems have reached the phase of providing, not only, the general voice communication service, but also, a packet data (packet) service in which users can perform high-speed, high-quality digital data transmission and multimedia services with a mobile terminal.

Today, in mobile communication systems supporting the packet service, HARQ technology is generalized in which for stable packet transmission, a mobile terminal sends, to a base station, information indicating success/failure in packet reception upon receipt of a packet from the base station, and then the base station retransmits the defective packet that the mobile terminal has failed to normally receive. HARQ is a kind of link control protocol in which upon receipt of a defective packet, a mobile terminal sends a base station a request for retransmission of the corresponding packet. Generally, it is actually impossible for a mobile terminal of the mobile communication system to receive the packets transmitted via a wireless network without any distortion or noises. Therefore, the HARQ technology presents various packet retransmission techniques to solve these problems.

HARQ technology-related terms used herein will be defined below.

The term 'packet' refers to a bit stream generated after encoding the original information, and the term 'subpacket' refers to a lump of bits transmitted at once when a coded bit stream is transmitted after it is divided into a plurality of lumps each composed of consecutive bits. In addition, 'control information' refers to addition information other than the original information necessary for receiving the subpacket or packet. Further, the term 'initial transmission subpacket (or initially transmitted subpacket)' refers to a first transmitted subpacket among subpackets, and the term 'retransmission subpacket (or retransmitted subpacket)' refers to a subpacket transmitted after the first subpacket.

The HARQ technology can be roughly classified into Synchronous HARQ (S-HARQ) and Asynchronous HARQ (AS-HARQ). S-HARQ is characterized in that retransmission for initial transmission is performed within a predetermined time. Herein, 'Synchronous' means synchronization in the time domain. AS-HARQ is characterized in that a time interval between the initial transmission and the retransmission is not fixed.

In S-HARQ, because a transmission time is predetermined, a retransmission subpacket should always be transmitted regardless of the channel condition, increasing the possibility of packet loss. However, in AS-HARQ, a receiver should first determine whether a received subpacket is a subpacket transmitted to the receiver itself. Therefore, even though the receiver has succeeded in reception of the initial transmission subpacket, it cannot always guarantee reception of the retransmission subpacket. However, AS-HARQ can select a time having a good channel condition for the retransmission, because the time interval between the initial transmission and the retransmission is not fixed.

Because AS-HARQ can determine a transmission time according to the channel condition, it can cope with a change in the channel condition in the manner of changing a modulation scheme at every retransmission time. However, it needs additional control information. S-HARQ can also use the channel adaptation scheme like the method of changing the modulation scheme, as it transmits control information at every retransmission time. However, given that S-HARQ is advantageous over AS-HARQ in that it can minimize the control information, the method of transmitting the control information at every retransmission time is not an effective approach.

Currently, FDMA systems are under discussion together with a resource allocation scheme and an HARQ scheme. The FDMA system is different from the conventional CDMA system and other communication systems in that it can define a basic unit of the resource allocation not only in the time domain but also in the frequency domain. In the conventional CDMA system, because user signals multiplexed with codes are transmitted over the full frequency band, resource allocation in the frequency domain is impossible. However, in a communication system, like the FDMA system, in which the basic resource allocation unit is defined not only in the time domain but also in the frequency domain, there is a need to modify the HARQ technology, which is based on the conventional CDMA system, to be suitable for the corresponding communication system. This is because intact use of the conventional HARQ technology may prevent efficient resource allocation (i.e., scheduling).

A typical example of the FDMA system, recently attracting attention, includes an Orthogonal Frequency Division Multiple Access (OFDMA) system. In brief, the OFDMA system refers to a multiple access system based on Orthogonal Frequency Division Multiplexing (OFDM), which is a multi-carrier transmission scheme that transmits a plurality of orthogonal subcarriers in an overlapping manner. OFDM can be applied to digital transmission technologies such as Digital Audio Broadcasting (DAB), Digital Television, Wireless Local Area Network (WLAN), etc. and it is known that OFDM can provide an efficient platform for high-speed data transmission due to its advantage of being robust against multipath fading.

When a forward link of a system capable of transmitting a plurality of channels over one slot, including the foregoing OFDMA system, uses the HARQ technology, resource allocation can be classified into persistent resource allocation for persistent traffic and non-persistent resource allocation for non-persistent traffic according to traffic type.

The persistent traffic means the traffic having a data characteristic in which the desired amount of transmission data can be persistently expected for a long time, like the Voice over Internet Protocol (VoIP) or Video Telephony data. However, the non-persistent traffic means the traffic whose transmission time and amount can be hardly expected, like the http, FTP, and e-mail data. A non-persistent resource allocation scheme for supporting the non-persistent traffic, as it allocates resources only when there is transmission data, transmits the traffic maximally taking the channel condition into account, pursuing high spectrum efficiency. On the contrary, a persistent resource allocation scheme for supporting the persistent traffic can minimize the amount of resources required for transmission of control information, because a transmitter and a receiver are allocated a predetermined amount of resources at a predetermined time without performing a separate signaling procedure between them. However, the persistent resource allocation scheme has difficulty in adaptively transmitting retransmission data by selecting a good channel environment.

Therefore, when a mobile communication system, like the OFDMA system in which resource allocation and non-persistent resource allocation may coexist, uses the HARQ technology, there is a need for a scheme capable of efficiently performing resource allocation.

SUMMARY OF THE INVENTION

An aspect of the present invention is to address at least the problems and/or disadvantages and to provide at least the advantages described below. Accordingly, one aspect of the present invention is to provide an HARQ method capable of efficiently using resources in a mobile communication system, and a transmission/reception method and apparatus using the same.

Another aspect of the present invention is to provide an HARQ method capable of minimizing transmission of control information in a mobile communication system supporting both persistent resource allocation and non-persistent resource allocation, and a transmission/reception method and apparatus using the same.

According to one aspect of the present invention, there is provided a Hybrid Automatic Repeat reQuest (HARQ) method performed in a receiver of a mobile communication system. The HARQ method includes receiving from a transmitter an initial transmission subpacket among a plurality of subpackets; sending a request for transmission of a retransmission subpacket to the transmitter upon failure to decode the initial transmission subpacket; receiving the retransmission subpacket using control information previously received from the transmitter upon failure to receive, from the transmitter, control information for reception of the retransmission subpacket; and receiving the retransmission subpacket using currently received control information upon receipt of the control information from the transmitter.

According to another aspect of the present invention, there is provided a Hybrid Automatic Repeat reQuest (HARQ) method performed in a transmitter of a mobile communication system. The HARQ method includes transmitting to a receiver an initial transmission subpacket among a plurality of subpackets; controlling allocation of a traffic channel over which a retransmission subpacket is transmitted, according to conditions of wireless resources, upon receipt of a transmission request for the retransmission subpacket from the receiver; and during transmission of the retransmission subpacket, generating control information including resource allocation information for reception of the retransmission subpacket and transmitting the control information to the receiver.

According to another aspect of the present invention, there is provided a receiver of a mobile communication system supporting Hybrid Automatic Repeat reQuest (HARQ). The receiver includes a signal receiver for receiving a plurality of subpackets transmitted from a transmitter, and control information for reception of the subpackets; a data and control information separator for separating data and the control information of each subpacket received from the signal receiver; and a controller for receiving a retransmission subpacket using control information previously received from the transmitter upon failure to receive, from the transmitter, control information for reception of the retransmission subpacket among the plurality of subpackets, and for receiving the retransmission subpacket using currently received control information upon receipt of the control information from the transmitter.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Exemplary embodiments of the present invention will now be described in detail with reference to the annexed drawings. In the following description, a detailed description of known functions and configurations incorporated herein has been omitted for clarity and conciseness.

The present invention will now be described in detail with reference to a system in which a plurality of channels can be simultaneously transmitted for a predetermined unit time (or slot).

Figure 1:
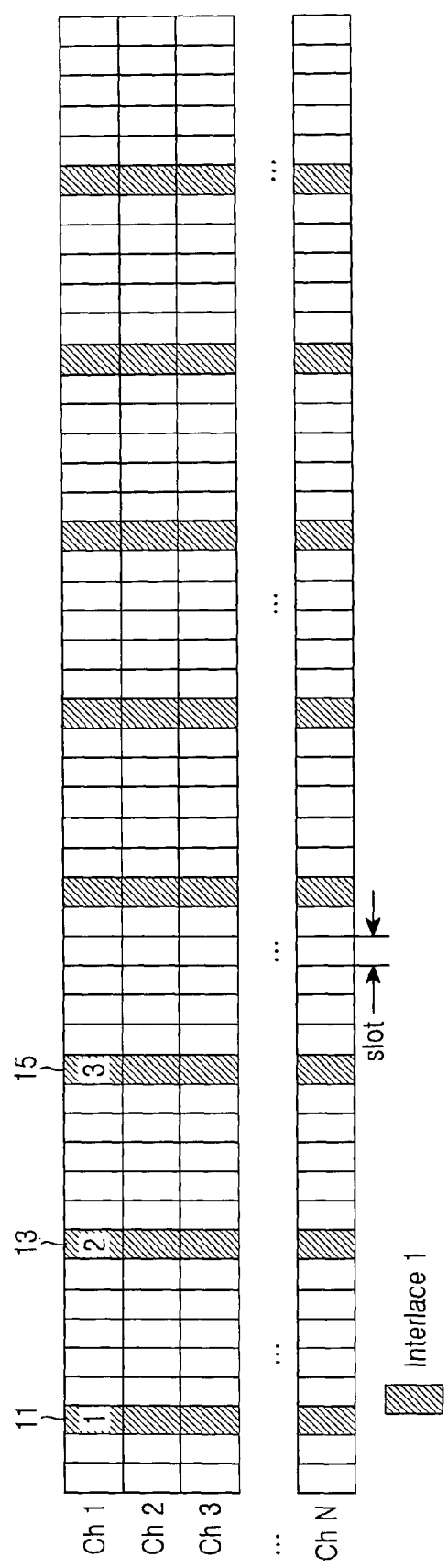
FIG. 1 illustrates a structure of a forward frame in a mobile communication system to which the present invention is applied.

FIG. 1 illustrates a structure of a forward frame in a mobile communication system to which the present invention is applied. In the forward frame structure shown in FIG. 1, a plurality of channels Ch1 to ChN can be simultaneously transmitted for one slot, and the forward frame is composed of, for example, 6 interlaces.

In the forward frame structure of FIG. 1, a basic transmission time unit is defined as a slot, and one slot belongs to one interlace. The present invention provides a frame structure for a system in which a plurality of channels each composed of consecutive time slots can be simultaneously transmitted for one slot. Basically, it is assumed herein that multiple channels Ch1 to ChN are logical channels. The logical channel can be mapped to a physical channel distinguishable with a code, and can be distinguished with a frequency resource composed of one or more subcarriers, or can be distinguished with a set of time and frequency resources. A physical channel mapped to one logical channel can also vary in the frequency and time axes according to a predetermined rule. The present invention, therefore, can be applied to any channel which is logically distinguishable.

An HARQ process transmitted for a slot belonging to an interlace 1 is also shown in FIG. 1. Reference numeral 11 indicates a slot for which a first subpacket is transmitted (initial transmission), reference numeral 13 indicates a slot for which a second subpacket is transmitted (first retransmission), and reference numeral 15 indicates a slot for which a third subpacket is transmitted (second retransmission). Although not illustrated in FIG. 1, it is assumed that after the third subpacket is transmitted, a receiver sends an ACK to a transmitter to transmit a new packet.

It is assumed that when the system having the transmission format of FIG. 1 performs HARQ, persistent resource allocation (persistent allocation) and non-persistent resource allocation (non-persistent allocation) occur simultaneously. Persistent allocation means a resource allocation scheme that allocates a predetermined amount of resources every predetermined time on a regular basis as described above. In this case, the system regularly transmits a packet over a predetermined channel at a predetermined time without using a control channel in order to save resources for allocating a control channel.

Figure 2:
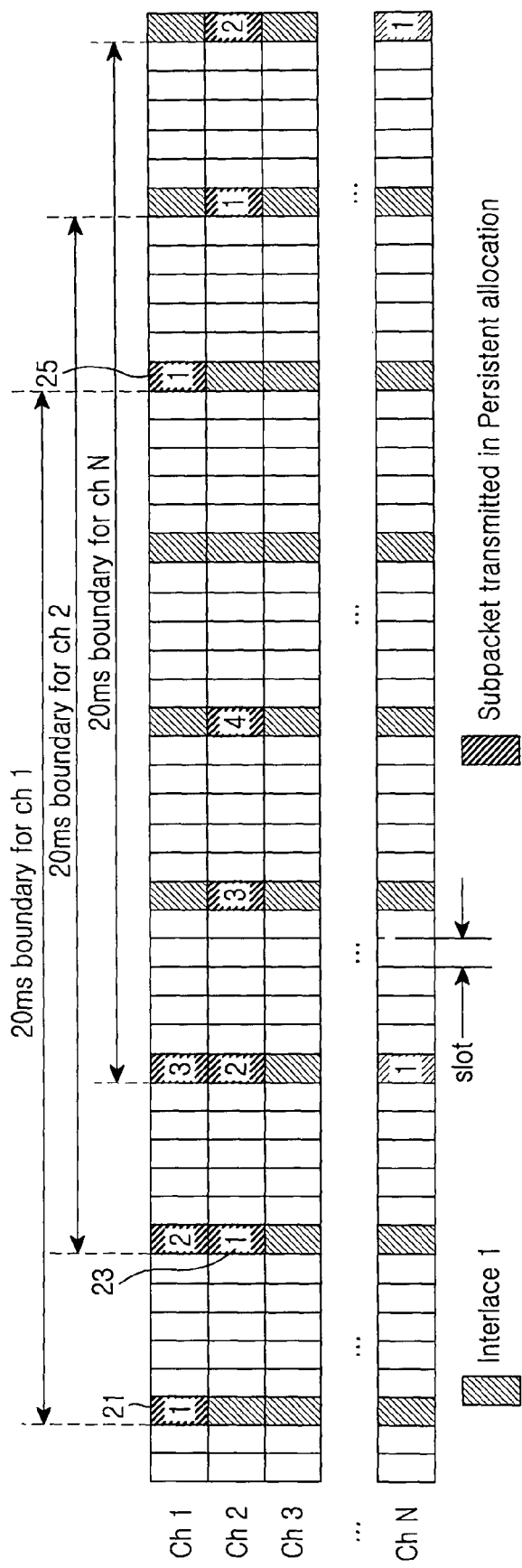
FIG. 2 illustrates an example in which a packet is transmitted by persistent allocation in a mobile communication system to which the present invention is applied.

FIG. 2 illustrates an example in which a packet is transmitted by persistent allocation in a mobile communication system to which the present invention is applied. The situation shown in FIG. 2 persistently allocates channels 1, 2, . . . , N to a specific user and then transmits a packet.

In FIG. 2, a resource allocation period is assumed to be 20 ms, and new initial transmission packets 21 and 25 are transmitted every 20 ms. HARQ process may early terminate or need retransmission according to channel condition. Ch1 indicates a state in which two retransmissions are performed until the HARQ process terminates, and in the next resource allocation period, no retransmission subpacket is transmitted as a receiver receives a first initial transmission packet and then succeeds in decoding the initial transmission packet. Ch2 indicates a state in which a total of 4 subpackets including an initial transmission packet 23 are transmitted. In FIG. 2, even for Ch2, after a lapse of 20 ms, a new packet is transmitted in the next resource allocation period. Generally, however, the channels should not necessarily be identical to each other in terms of a transmission period of the initial transmission packet.

As shown in FIG. 2, persistent allocation can save the resources required for transmission of control information because it transmits each subpacket rather than transmitting control information after periodically allocating resources during the HARQ process. However, in persistent allocation, the resources persistently allocated by each channel may remain, and when the HARQ process early terminates, the remaining resources are wasted inevitably. Therefore, the present invention provides a scheme capable of efficiently using the resources left after the HARQ process, through non-persistent allocation.

Figure 3:
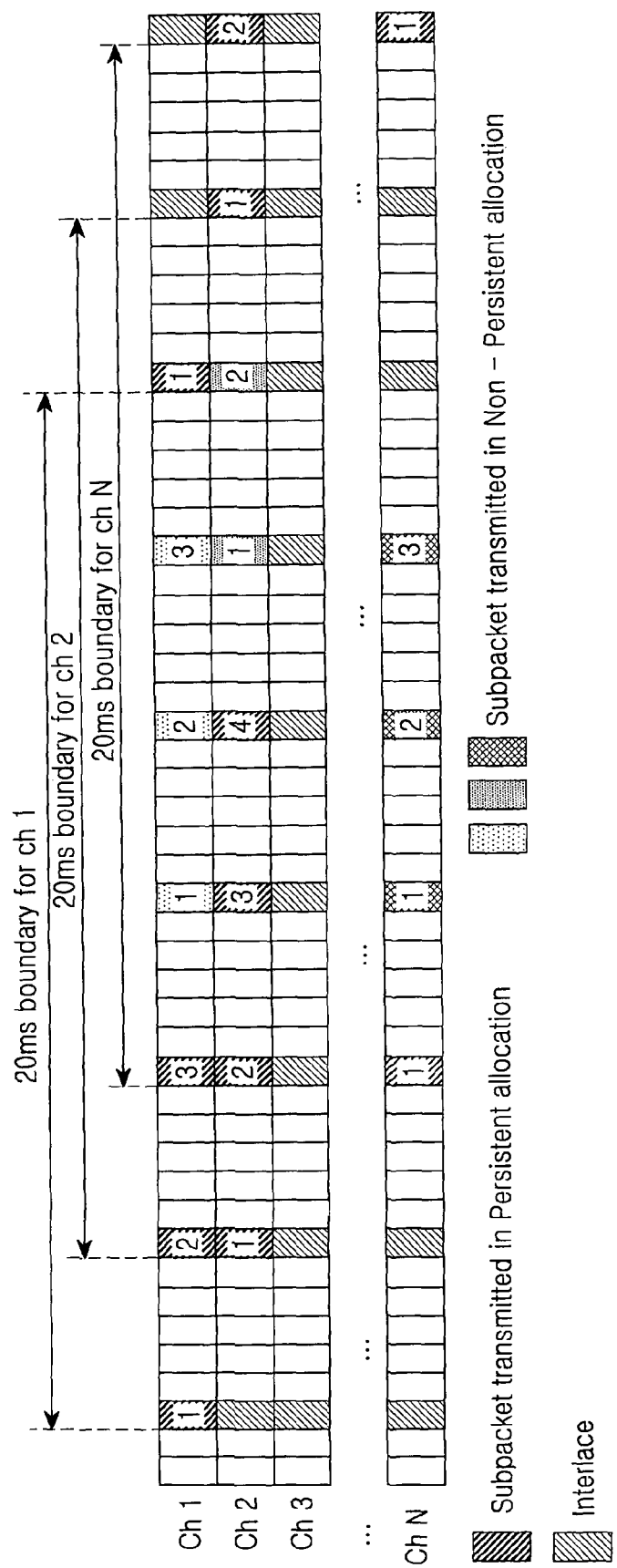
FIG. 3 illustrates an example of using resources left after performing persistent allocation, for non-persistent allocation in a mobile communication system to which the present invention is applied.

FIG. 3 illustrates an example of using resources left after performing persistent allocation, for non-persistent allocation in a mobile communication system to which the present invention is applied. In FIG. 3, S-HARQ is used in non-persistent allocation.

The example shown in FIG. 3 allocates the slots left until the next allocation period after performing persistent allocation, to other users by non-persistent allocation. The packets transmitted by the non-persistent allocation scheme, because their transmission times and destinations are not determined, are transmitted together with control channel in order to provide control information such as destination, transmission format, and the number of slots of the packets. The non-persistent allocation scheme is a temporary resource allocation scheme that terminates when an ACK is received from the receiver.

Both S-HARQ and AS-HARQ can be used for the non-persistent allocation. Because the amount of resources left after the persistent allocation is constant, it is most preferable to use AS-HARQ in terms of resource reuse, but AS-HARQ should transmit control information for every subpacket undesirably. However, in S-HARQ in which a subpacket transmission time is predetermined, because persistent traffic unaccompanied with control information is transmitted at a 20-ms boundary, a transmitter should stop transmission of non-persistent traffic even though it fails to receive an ACK.

Therefore, the present invention provides an HARQ method that efficiently uses resources while minimizing transmission of control channels. The HARQ method provided by the present invention has a basic strategy of transmitting packets on a synchronous basis and transmitting control channels on a demand (or asynchronous) basis. As such, the present invention provides HARQ methods in two different aspects, and an HARQ method in a first aspect has the following characteristics:

(a) One HARQ process can be transmitted after being separated into a plurality of spans.

(b) The span means a set of subpackets transmitted in a synchronous manner.

(c) However, a first subpacket (or leading subpacket) of each span is transmitted in an asynchronous manner, and subpackets in the same span, following the leading subpacket, are transmitted in a synchronous manner.

(d) All subpackets are transmitted in the same interlace.

(e) Control information transmitted to a receiver and a leading subpacket of each span should necessarily be transmitted together.

(f) Even the subpackets other than the leading subpacket in each span can, but not necessarily, be transmitted together with control information. The receiver, if it has no control information, continuously receives subpackets in a synchronous manner using the previously received control information. If control information is transmitted to the receiver, the receiver can add a new channel or replace the existing channel using a Resource Addition Indicator (RAI) included in the control information. For example, the receiver replaces the existing channel for RAI='0', and adds a new channel to the exiting channel for RAI='1'.

(g) The control information transmitted together with each subpacket can include information shown in Table 1.

TABLE 1

| Control Information Item | Definition |
| --- | --- |
| MACID | This is a Media Access Control (MAC) ID, and indicates an identifier of a receiver, i.e. terminal. |
| Channel Number | This is a unique number of a data channel over which subpackets will be transmitted, and indicates physical resources. |
| MCS Information or Transmission Format | MCS indicates a Modulation Coding Scheme, and for Transmission Format, an encoder packet size and an MCS level can be expressed as one index. This item means an index indicating a combination of modulation, encoder packet size, maximum transmission subpacket, etc. |
| Span Length | This indicates the number of subpackets belonging to this span. |
| RAI | This is a Resource Addition Indicator, and is necessarily set to '0' when this information is transmitted together with a leading subpacket. It can be set to '0' or '1' when this information is transmitted together with subpackets other than the leading subpacket. RAI = '0' indicates that the existing channel is replaced with a newly allocated channel, and RAI = '1' indicates that subpackets are transmitted using all of a newly allocated channel and the previously allocated channels until the current span terminates, beginning from this slot. |
| NPI | This is a New Packet Indicator, and NPI is toggled between '1' and '0' every new HARQ process. All NPIs belonging to one HARQ process have the same value. |

In Table 1, "MACID" and "Channel Number" are mandatory control information, and the other control information is not a mandatory factor but information being able to be added or deleted.

Application of the HARQ method of the present invention having the foregoing characteristics may provide the following advantages.

In order for one HARQ process to terminate, a transmitter should receive an ACK from a receiver, and the transmitter generally needs several retransmissions before it receives the ACK. However, because the provided HARQ method groups the several retransmissions into spans and then transmits each span in an asynchronous manner, it can perform retransmission only when there is available resource, thereby avoiding the possible situation in which the retransmission should be interrupted due to lack of resources. In addition, because the present invention transmits the remaining subpackets except for the leading subpacket of each span in a synchronous manner, it does not need additional transmission of a control channel, thereby saving resources. With transmission of the additional control information, the present invention can replace or add data channels.

In FIGS. 4 to 7, a detailed description will now be made of an HARQ method according to one aspect of the present invention.

Figure 4:
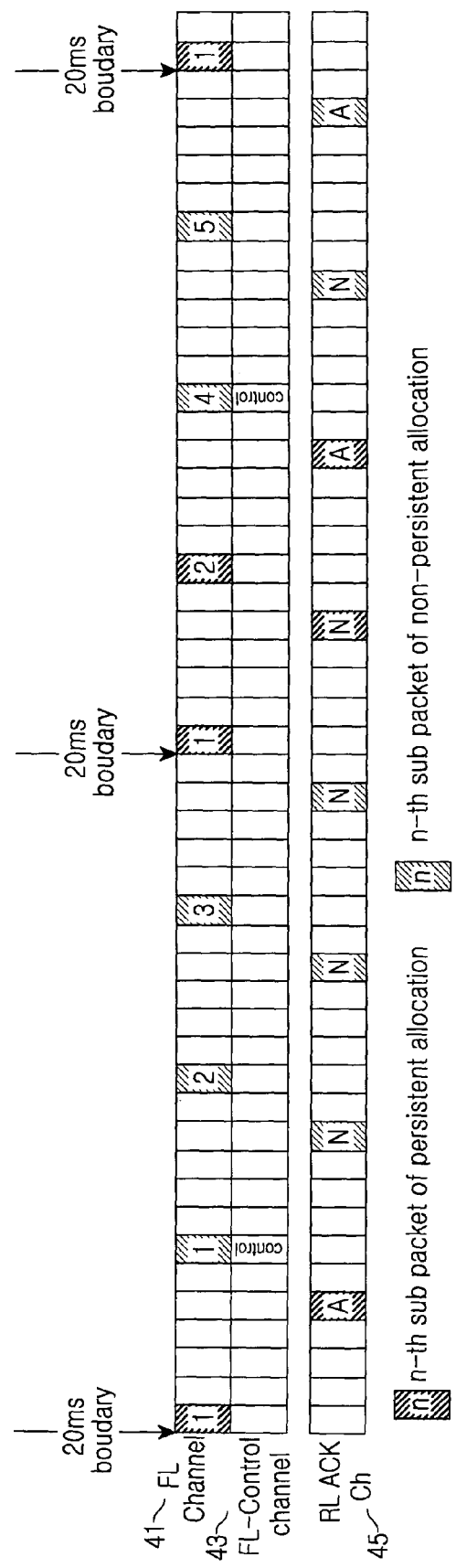
FIG. 4 illustrates a process of transmitting subpackets and control information when each span uses the same channel in an HARQ method according to one aspect of the present invention.

FIG. 4 illustrates a process of transmitting subpackets and control information when each span uses the same channel in an HARQ method according to one aspect of the present invention.

In FIG. 4, reference numeral 41 indicates a forward traffic channel over which forward traffics are transmitted, reference numeral 43 indicates a forward control channel over which control information is transmitted, and reference numeral 45 indicates a reverse ACK channel over which an ACK signal of a terminal is transmitted. In addition, reference letters 'A', 'N' and 'control' indicate an ACK signal, a NACK signal, and control information, respectively. FIG. 4 further shows that persistent traffic is transmitted over the forward traffic channel 41 at 20-ms periods and the system transmits non-persistent traffic upon receipt of the ACK 'A' over the reverse ACK channel 45 in response to the corresponding traffic.

Subpackets transmitted through persistent allocation and subpackets transmitted through non-persistent allocation are shown in FIG. 4 with different hatchings. In the example of FIG. 4, three subpackets are transmitted while a first span is transmitted in first non-persistent allocation, and two subpackets are transmitted while a second span is transmitted in second non-persistent allocation. In addition, a channel number allocated in the second transmitted control channel uses the same number as the channel number used in the first span, and in each span, a control channel is transmitted only in the leading subpacket. After receiving the leading subpacket and control information, the receiver can determine how many subpackets are transmitted in the corresponding span, avoiding the possible problem of receiving persistent traffic.

Figure 5:
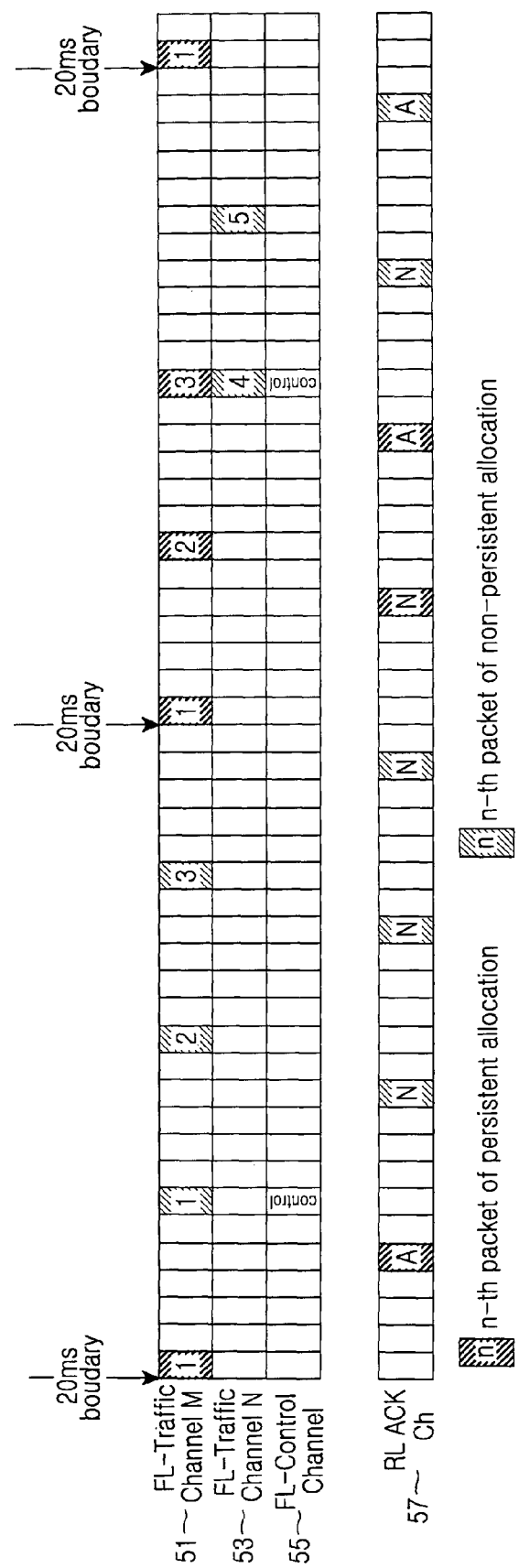
FIG. 5 illustrates a process of transmitting subpackets by changing traffic channels when a new span starts in an HARQ method according to one aspect of the present invention.

FIG. 5 illustrates a process of transmitting subpackets by changing traffic channels when a new span starts in an HARQ method according to one aspect of the present invention. In FIG. 5, reference numerals 51 and 53 indicate forward traffic channels M and N, respectively, reference numeral 55 indicates a forward control channel over which control information is transmitted, and reference numeral 57 indicates a reverse ACK channel over which an ACK signal of a terminal is transmitted. In addition, reference letters 'A', 'N' and 'control' are equal to those described in FIG. 4. FIG. 5 shows when a new span starts in the HARQ process according to the present invention, the traffic channel over which subpackets are transmitted changes from the traffic channel M to the traffic channel N.

Figure 6:
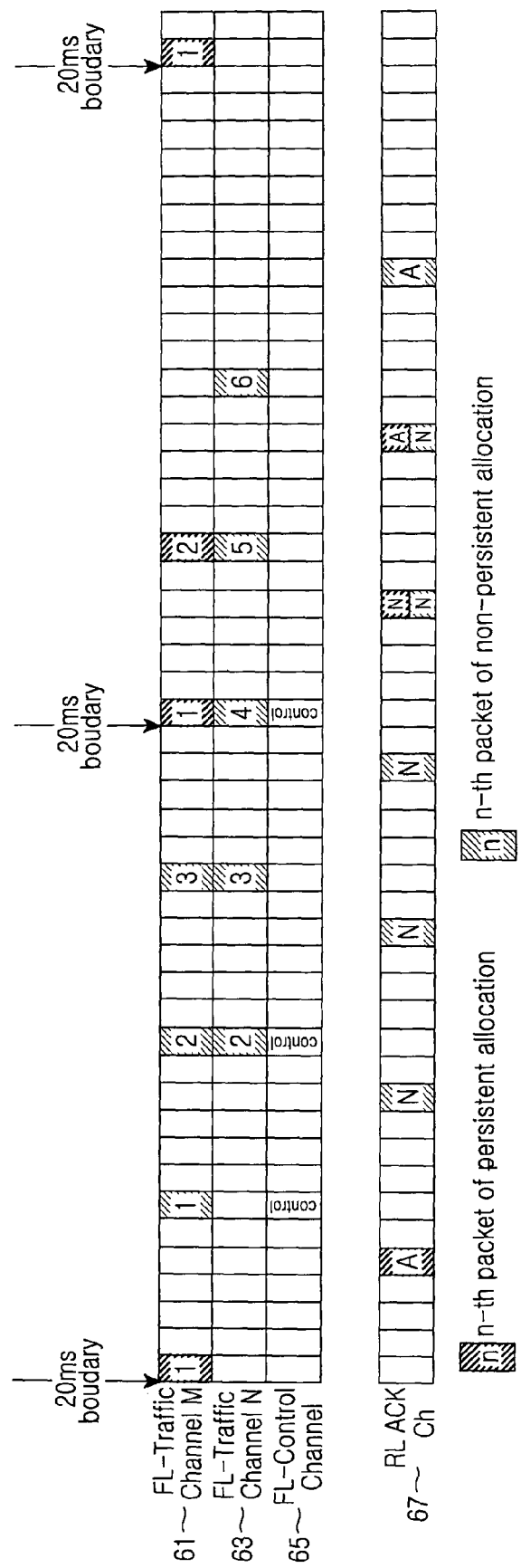
FIG. 6 illustrates a process of adding/changing channels in an HARQ method according to one aspect of the present invention.

FIG. 6 illustrates a process of adding/changing channels in an HARQ method according to one aspect of the present invention. Reference numerals 61 to 67 are equal to their corresponding channels, so a detailed description thereof will be omitted.

In FIG. 6, during initial transmission of non-persistent traffic, control information is transmitted with span length=3. Furthermore, after a traffic channel M is allocated, a new data channel N is allocated as control information is additionally received during first retransmission, and the two channels are used simultaneously until the first span terminates. A second span immediately starts in a first slot after termination of the first span. A fourth subpacket is transmitted together with control channel, and in this case, a span length is set to 4. In the second span, because only one channel number N is included in control information, transmission continues only with the traffic channel N. After transmitting a sixth subpacket in the traffic channel N, a receiver transmits an ACK, and a transmitter terminates the HARQ process.

A description will now be made of an operation of a receiver, i.e. terminal, in an HARQ method according to one aspect of the present invention.

Figure 7A:
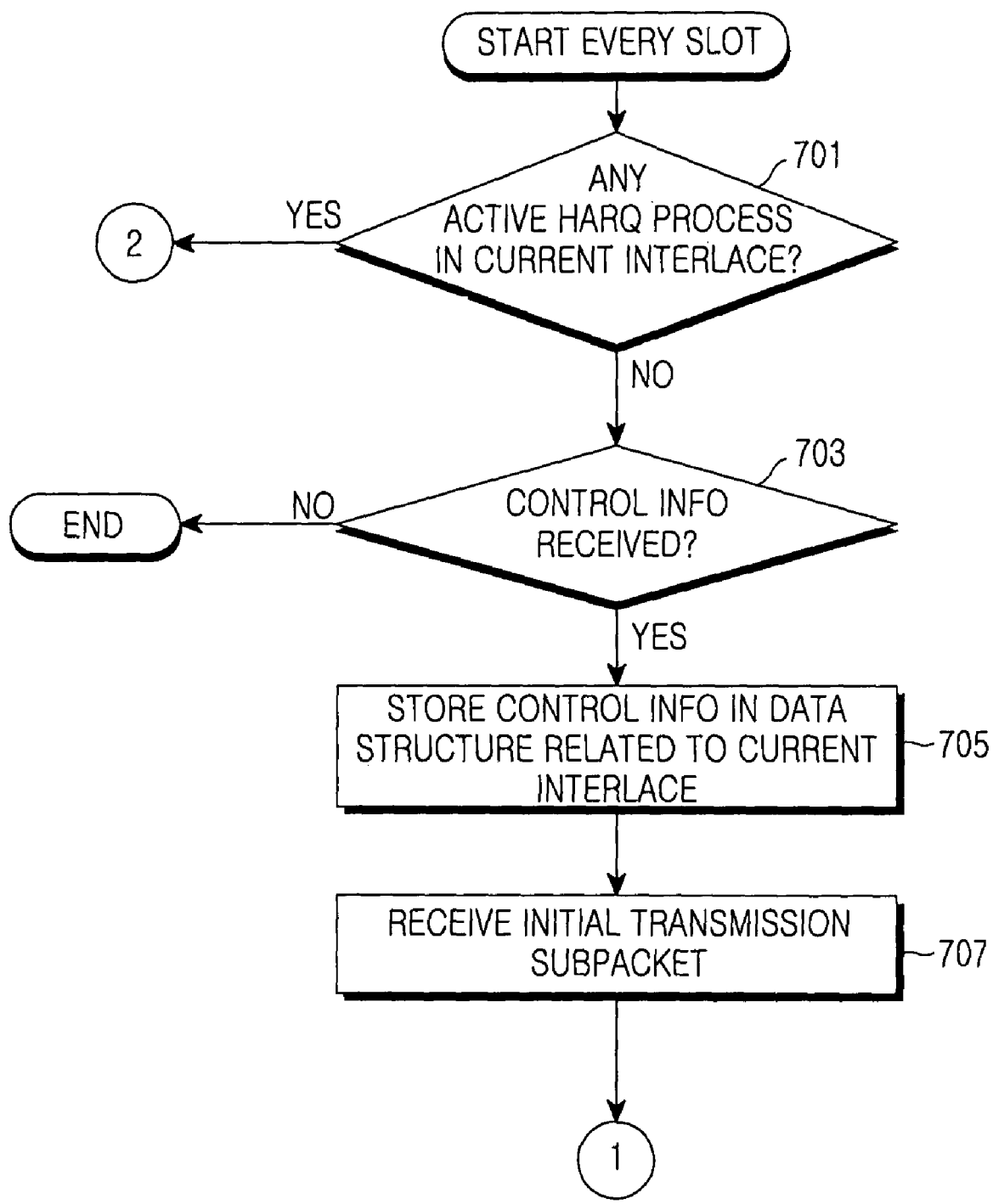
FIGS. 7A and 7B illustrate a terminal process of receiving subpackets and control information in an HARQ method according to one aspect of the present invention.
Figure 7B:
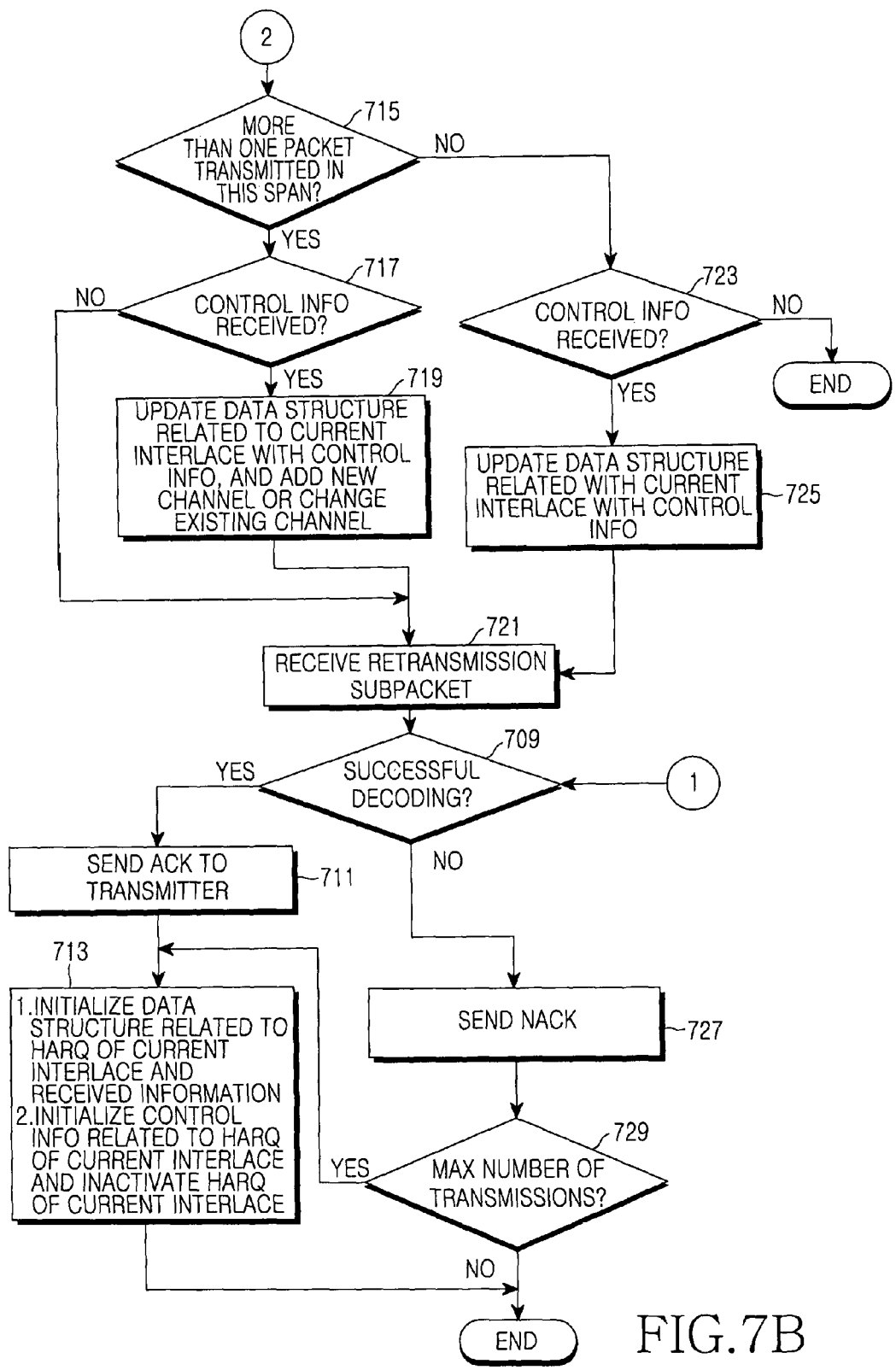

FIGS. 7A and 7B illustrate a terminal process of receiving subpackets and control information in an HARQ method according to one aspect of the present invention.

In operation, a terminal repeats the following reception operation every slot. The terminal determines in step 701 whether there is any active HARQ process in the current interlace. If there is no active HARQ process, the terminal determines in step 703 whether there is any received control information. If it is determined in step 703 that there is received control information, the terminal stores the corresponding control information as data related to the current interlace in step 705. Thereafter, the terminal receives in step 707 a subpacket initially transmitted in the current slot using the corresponding control information. If the terminal succeeds in decoding the initial transmission subpacket in step 709, the terminal then sends in step 711 an ACK signal to a transmitter that transmitted the subpacket, and then initializes in step 713 a relevant data structure and control information for reception in the current interlace and inactivates an HARQ process of the current interlace.

However, if it is determined in step 701 that there is a currently activated HARQ process, the terminal determines in step 715 whether the number of subpackets that it should receive in the current span including the current slot is greater than or equal to 1. If the number is greater than or equal to 1, the terminal determines in step 717 whether control information is received. If it is determined in step 717 that there is control information received at the terminal, the terminal updates in step 719 the data structure related to the current interlace using the corresponding control information. In addition, control information transmitted together with span may include channel information that should be changed or added, and upon receipt of the channel information, the terminal performs a predetermined operation of adding a new channel or changing a channel number of the existing channel to another newly allocated channel number according to the corresponding channel information, and then receives in step 721 a subpacket retransmitted in the current slot. However, if it is determined in step 717 that there is no received control information, the terminal receives in step 721 a subpacket retransmitted in the current slot using the previously received control information. Even though there is no control information received at the terminal, if a rule of hopping to a certain channel number every slot is predefined between the terminal and a base station, the terminal can perform an operation of replacing (hopping) the channel number even though no control channel is received.

If it is determined in step 715 that there is no more packet to receive as this span completely terminates, the terminal determines in step 723 whether there is any received control information. This is because the next span is always transmitted together with control information. If there is received control information, the terminal updates the data structure related to the current interlace in step 725, and receives a subpacket transmitted together with the control information in step 721. In addition, the control information transmitted to the terminal includes information such as a channel number of a channel transmitted in this span, and the number of subpackets included in this span. The subpacket received in the above process is a leading subpacket of a second or later span. After receiving the retransmitted subpacket, the terminal performs decoding thereon in step 709, and if the terminal succeeds in the decoding, it sends an ACK signal in step 711 and then repeats the operation of step 713. However, if the terminal fails in the decoding in step 709, it sends in step 727 to the transmitter a NACK signal indicating the failure to normally receive the corresponding subpacket, and determines in step 729 whether the current transmission has reached a predetermined maximum number of retransmissions. If the current transmission has reached the maximum number of retransmissions, the terminal initializes in step 713 the control information related to the activated HARQ process of the current interlace and then inactivates the HARQ process corresponding to the current interlace. If the current transmission has not reached the maximum number of retransmissions in step 729 even though the terminal has failed in the decoding in step 709, the terminal waits for the packet transmitted in the next slot of the current interlace.

In FIGS. 8 to 11, a detailed description will now be made of an HARQ method according to another aspect of the present invention.

The HARQ method according to another aspect of the present invention is different from the HARQ method described in FIGS. 4 to 7 in that span length information is not included in the control information. Therefore, the HARQ method according to another aspect should necessarily operate in a synchronous manner, and one HARQ process is transmitted with one span.

The HARQ method according to this aspect is characterized in that initial transmission subpacket is transmitted in an asynchronous manner, and all retransmission subpackets are transmitted in a synchronous manner. In addition, the control information transmitted to a terminal when a transmitter receives each subpacket can include MACID, Channel Number, MCS Level or Transmission Format, RAI, and NPI described in Table 1. MACID and Channel Number are mandatory information, and the other information is not a mandatory factor.

In the HARQ method according to this aspect, because all retransmission subpackets except for the initial transmission subpacket are transmitted in a synchronous manner, there is no need for the control information indicating a span length. In addition, this scheme is shorter than the first scheme in terms of a delay time required on average for packet transmission, and can replace the channel in use, using the control information during retransmission, facilitating efficient use of resources.

Figure 8:
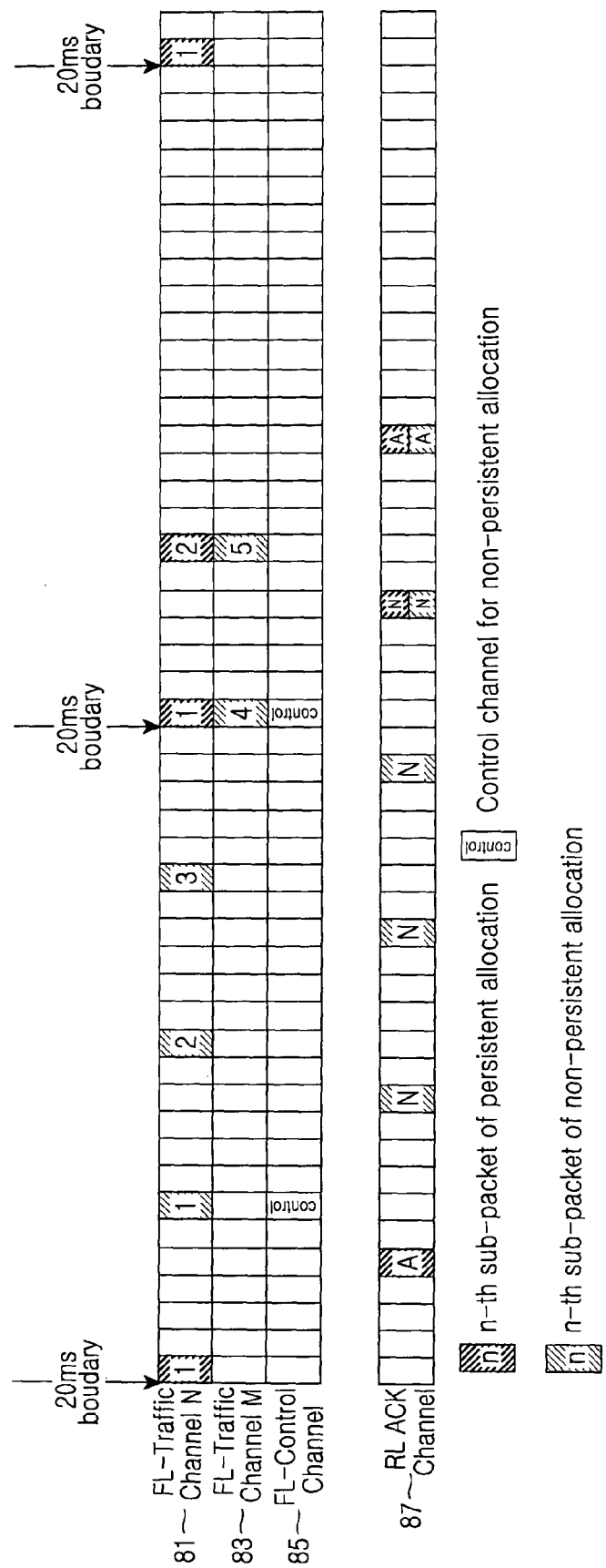
FIG. 8 illustrates a process of changing a traffic channel in an HARQ method according to another aspect of the present invention.

FIG. 8 illustrates a process of changing a traffic channel in an HARQ method according to another aspect of the present invention.

In FIG. 8, reference numerals 81 and 83 indicate forward traffic channels N and M, respectively, reference numeral 85 indicates a forward control channel over which control information is transmitted, and reference numeral 87 indicates a reverse ACK channel over which an ACK signal of a terminal is transmitted. In addition, reference letters 'A', 'N' and 'control' are equal to those described in FIG. 4. FIG. 8 further shows an example in which while a transmitter transmits persistent traffic using the forward traffic channel N, if an HARQ process early terminates, the transmitter transmits non-persistent traffic using the left resources. Non-persistent traffic transmitted over the traffic channel N is transmitted together with a control channel during initial transmission. The control information transmitted over the control channel can include MCS level and channel information. If there is a need to transmit persistent traffic over a slot for which the transmitter will transmit a specific subpacket, the transmitter reallocates a channel for the HARQ process by allocating a new channel number. When the transmitter changes the channel in this manner, RAI of Table 1 is set to '0'. The control information is transmitted together during retransmission, and in this case, if RAI is set to '1', the transmitter continues the HARQ process by adding the allocated channel. The transmitter performs an operation of increasing the amount of resources. As a result, the number of coded bits transmitted for one slot increases, causing early termination of the HARQ process.

Figure 9:
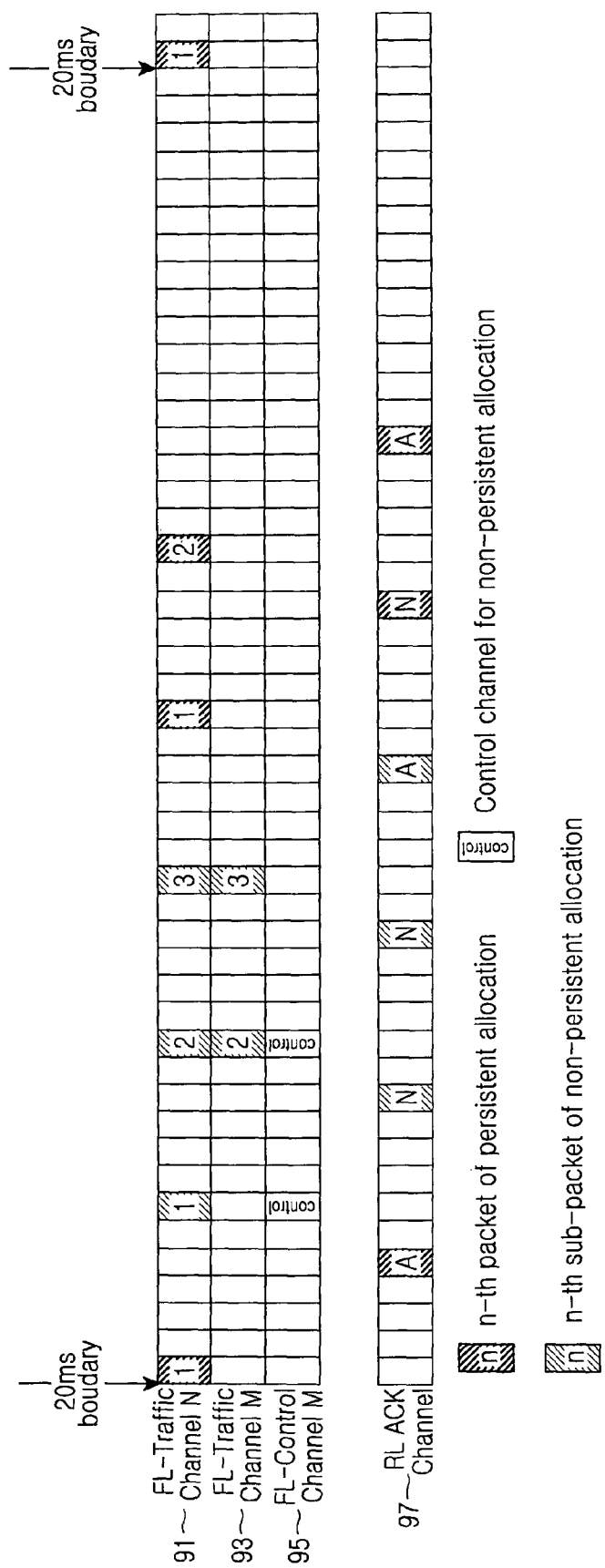
FIG. 9 illustrates a process of adding a traffic channel in an HARQ method according to another aspect of the present invention.

FIG. 9 illustrates a process of adding a traffic channel in an HARQ method according to another aspect of the present invention.

In FIG. 9, reference numerals 91 and 93 indicate forward traffic channel N and M, respectively, reference numeral 95 indicates a forward control channel over which control information is transmitted, and reference numeral 87 indicates a reverse ACK channel over which an ACK signal of a terminal is transmitted. In addition, reference letters 'A', 'N' and 'control' are equal to those described in FIG. 4. FIG. 9 shows an example in which second transmitted control information includes a new channel number M for an added traffic channel, and RAI is set to '1'.

A description will now be made of an operation of a receiver, i.e. terminal, in an HARQ method according to another aspect of the present invention.

Figure 10A:
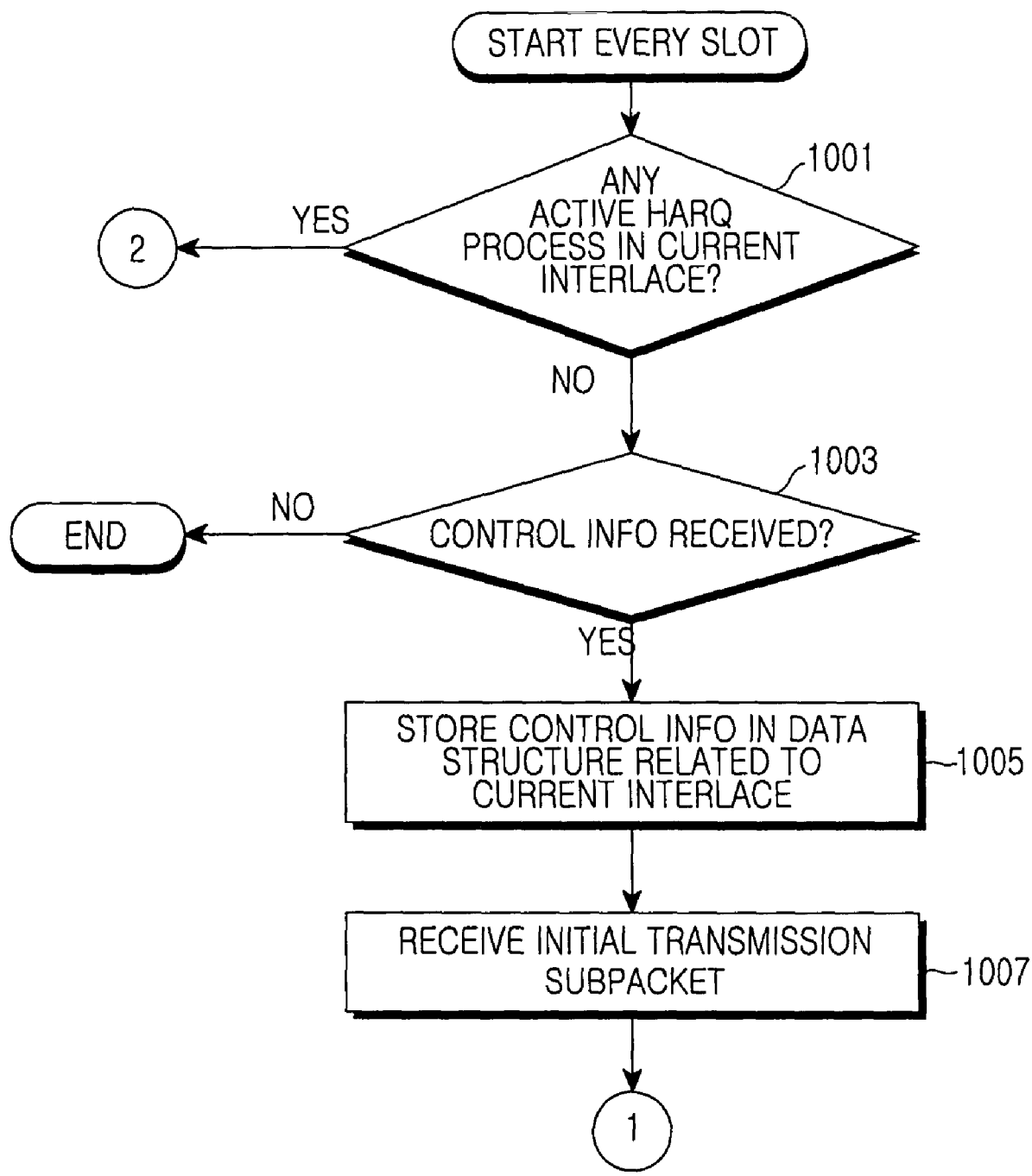
FIGS. 10A and 10B illustrate a terminal operation of receiving subpackets and control information in an HARQ method according to another aspect of the present invention.
Figure 10B:
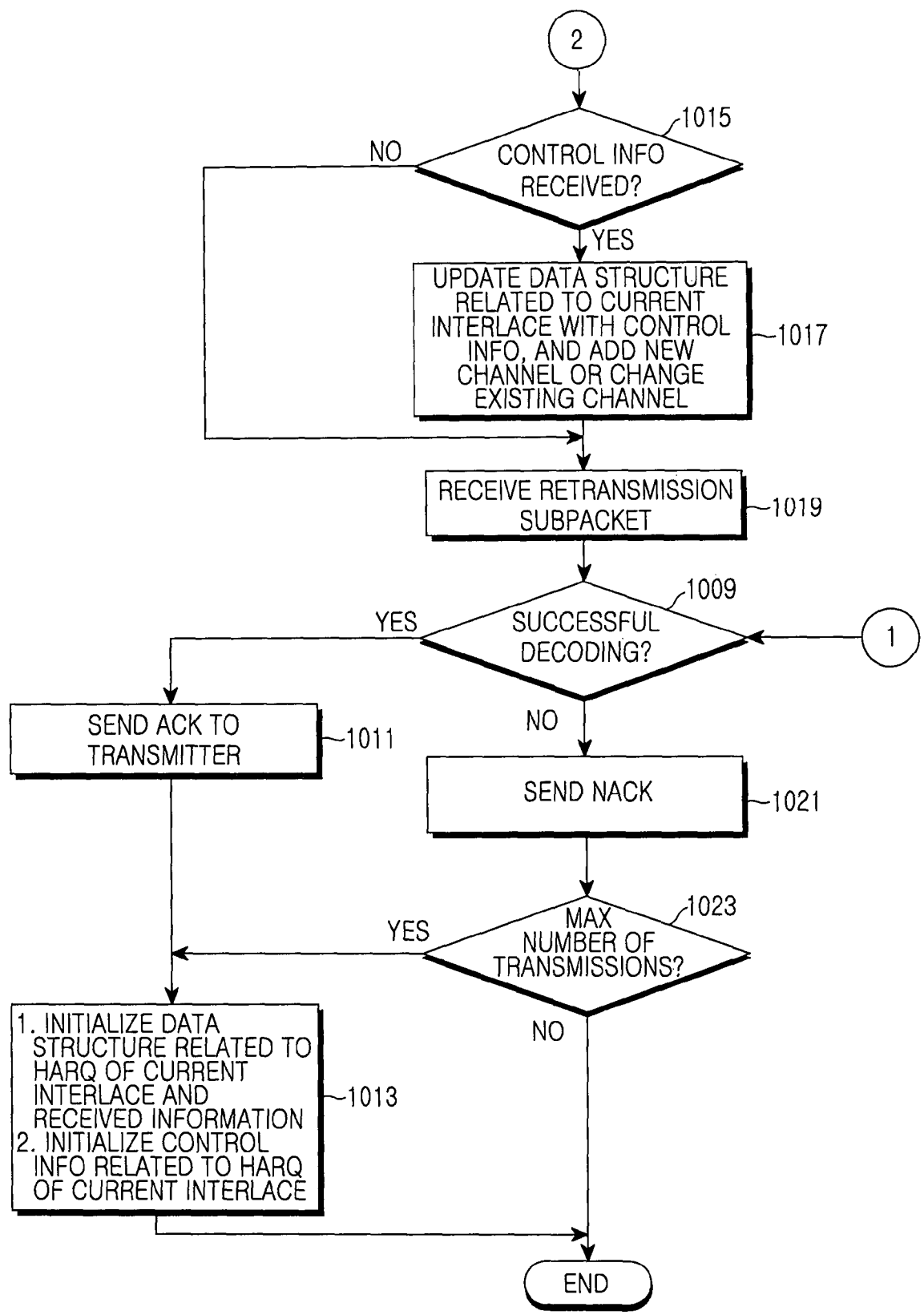

FIGS. 10A and 10B illustrate a terminal process of receiving subpackets and control information in an HARQ method according to another aspect of the present invention.

A terminal repeats the following reception operation every slot. The terminal determines in step 1001 whether there is any active HARQ process in the current interlace. In operation, if there is no active HARQ process, the terminal determines in step 1003 whether there is any received control information. If it is determined in step 1003 that there is received control information, the terminal stores in step 1005 the corresponding control information as control information for receiving the next subpacket in the current interlace. Thereafter, the terminal receives in step 1007 a subpacket initially transmitted in the current slot using the corresponding control information. If the terminal succeeds in decoding the initial transmission subpacket in step 1009, the terminal sends in step 1011 an ACK signal to a transmitter that transmitted the subpacket, and then initializes in step 1013 a relevant data structure and control information for reception in the current interlace and inactivates an HARQ process of the current interlace.

However, if it is determined in step 1001 that there is a currently activated HARQ process, the terminal determines in step 1015 whether there is any received control information. If there is received control information, the terminal updates in step 1017 a data structure related to the current interlace using the corresponding control information. The control information transmitted together can include information on the channel that should be changed or added, and upon receipt of the channel information, the terminal performs a predetermined operation of adding a new channel or changing a channel number of the existing channel according to the corresponding channel information, and then receives in step 1019 a subpacket retransmitted in the current slot. However, if it is determined in step 1015 that there is no received control information, the terminal receives in step 1019 a subpacket retransmitted in the current slot using the previously received control information. If there is a predetermined rule between the terminal and a base station and when the terminal changes both transmission and reception channels to particular channels in a particular slot, the terminal can change the channels without control information.

After receiving an initial transmission subpacket in step 1007 or receiving a retransmitted subpacket in step 1019, the terminal decodes the received subpacket in step 1009. If the terminal has succeeded in the decoding, it sends an ACK signal in step 1011, and then repeats the operation of step 1013. However, if the terminal has failed in the decoding in step 1009, it then sends a NACK signal to the transmitter in step 1021, and determines in step 1023 whether the current transmission has reached a predetermined maximum number of retransmissions. If the current transmission has reached the maximum number of retransmissions, the terminal initializes in step 1013 the control information related to the activated HARQ process of the current interlace and then inactivates the HARQ process corresponding to the current interlace. If the current transmission has not reached the maximum number of retransmissions in step 1023 even though the terminal has failed in the decoding in step 1009, the terminal waits for the packet transmitted in the next slot of the current interlace.

Moreover, the HARQ schemes described above can be used even for persistent transmission. Generally, persistent transmission transmits data in a predetermined point at a predetermine time without transmitting control information. However, even for the persistent transmission, an operation of changing a channel number by transmitting control information during initial transmission or retransmission is possible. In persistent transmission, various scenarios are possible, such as a scenario in which control channel is omitted for initial transmission, a scenario in which a control channel is transmitted only for retransmission, a scenario in which a control channel is transmitted only for initial transmission, and a scenario in which a control channel is transmitted for both retransmission and initial transmission.

Although the foregoing description has been made for the situation in which HARQ is generally used for the resources left after performing persistent transmission, the provided HARQ technology is not restrictively applied to this situation. The provided HARQ technology has broader application than the conventional HARQ technology. In addition, the provided HARQ technology can be applied to the situation in which there is no persistent transmission.

Figure 11:
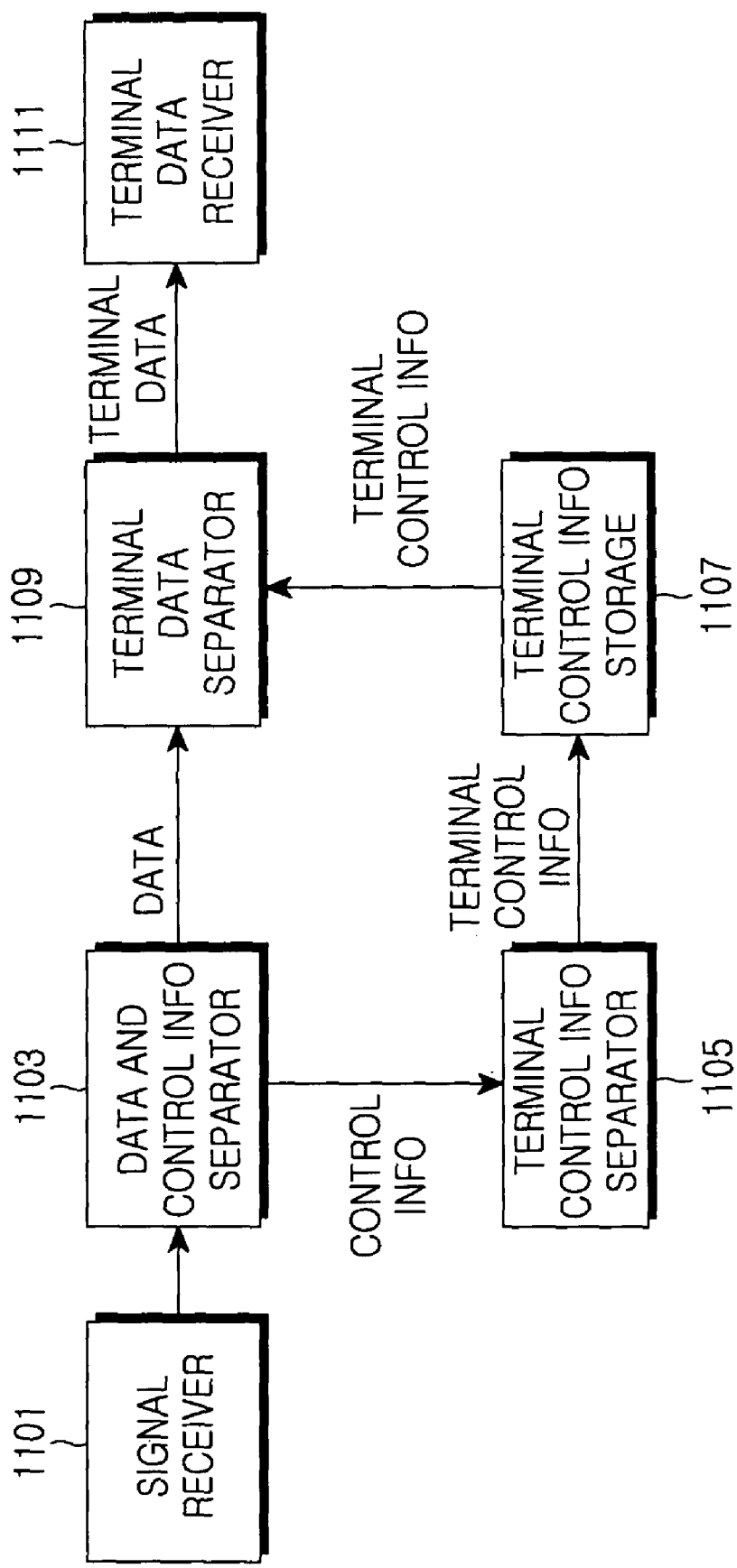
FIG. 11 illustrates a schematic block diagram of an internal structure of a receiver to which a proposed HARQ method is applied according to an embodiment of the present invention.

FIG. 11 illustrates a schematic block diagram of an internal structure of a receiver to which a HARQ method of the present invention is applied according to an embodiment of the present invention. Here, the receiver structure of FIG. 11 can be applied to both HARQ methods described in FIGS. 4 to 10.

In FIG. 11, a signal receiver 1101 performs signal processing on subpackets and/or control information received from a transmitter, and delivers the processed received signals to a data and control information separator 1103. The data and control information separator 1103 separates data and control information from the received signals. The 'data' refers to data including not only the subpacket transmitted to the receiver itself, but also the subpackets transmitted to other terminals. Likewise, the control information also includes control information transmitted to other terminals.

A terminal control information separator 1105 separates control information of the corresponding terminal from the control information delivered from the data and control information separator 1103, and stores the separated control information in a terminal control information storage 1107. A terminal data separator 1109 separates data of the corresponding terminal from the data delivered from the data and control information separator 1103 using the control information of the corresponding terminal, delivered from the terminal control information storage 1107. A terminal data receiver 1111 receives and stores data of the corresponding terminal, delivered from the terminal data separator 1109. If there is no control information separated by the terminal control information separator 1105 as there is no control information for the corresponding terminal, the terminal data separator 1109 separates data transmitted to the corresponding terminal from the received signals using the previously stored control information.

As described above, the present invention provides an HARQ method that can be applied to a mobile communication system in which a transmitter capable of transmitting data over a plurality of channels for one slot, can simultaneously transmit persistent traffic for periodically allocating and transmitting resources in a fixed point without using control information, and non-persistent traffic for transmitting control information together only when necessary. The HARQ method is not restrictively used only for non-persistent traffic transmission, but can also be applied to most fields where the HARQ technology is used.

The HARQ method of the invention can perform an operation of replacing or adding physical channels necessary for data transmission by transmitting control information on a demand basis, thereby advantageously increasing resource efficiency between a receiver and a transmitter that simultaneously transmits data to a plurality of users over a plurality of channels, and facilitating simple system implementation.

Moreover, in a mobile communication system where persistent traffic and non-persistent traffic can be simultaneously transmitted, the present invention allows for efficient use of available resources while minimizing the control information transmitted to the terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Hybrid Automatic Repeat reQuest (HARQ) method performed in a receiver of a mobile communication system, the HARQ method comprising:
   receiving from a transmitter a leading subpacket among a plurality of subpackets and first control information;
   sending a request for transmission of a retransmission subpacket to the transmitter upon failure to decode the initial transmission subpacket;
   receiving the retransmission subpacket using the first control information if second control information for reception of the retransmission subpacket is not received after sending the request for transmission of the retransmission subpacket; and
   receiving the retransmission subpacket using the second control information if the second control information for reception of the retransmission subpacket is received after sending the request for transmission of the retransmission subpacket.

2. The HARQ method of claim 1, further comprising:
   receiving the retransmission subpacket using a previously allocated traffic channel and a traffic channel additionally allocated based on resource addition information, if the control information includes the resource addition information for reception of the retransmission subpacket.

3. The HARQ method of claim 2, wherein the resource addition information is indicated by a combination of information included in the control information.

4. The HARQ method of claim 1, further comprising:
   receiving the retransmission subpacket using a traffic channel changed based on resource change information, if the control information includes the resource change information for reception of the retransmission subpacket.

5. The HARQ method of claim 4, wherein the resource change information is indicated by a combination of information included in the control information.

6. The HARQ method of claim 1, further comprising:
   updating a data structure related to an interlace for receiving the plurality of subpackets upon receipt of the control information.

7. The HARQ method of claim 1, wherein the control information includes a Media Access Control Identifier (MACID) of the receiver and a channel number of a traffic channel over which the subpackets are transmitted.

8. The HARQ method of claim 1, wherein if a specific set of the subpackets transmitted from the transmitter according to the HARQ is defined as a span, a process of the HARQ is performed by receiving at least one span.

9. The HARQ method of claim 8, wherein if control information for reception of the span is transmitted together with at least one of the plurality of subpackets, subpackets belonging to the corresponding span are received using the control information for reception of the span.

10. The HARQ method of claim 8, wherein the plurality of subpackets transmitted in the span are received in a synchronous manner using the first control information.

11. The HARQ method of claim 8, wherein a first subpacket among the plurality of subpackets transmitted in the span is received in an asynchronous manner according to control information received together with the first subpacket, and the remaining subpackets are received in a synchronous manner using the control information received together.

12. A Hybrid Automatic Repeat reQuest (HARQ) method performed in a transmitter of a mobile communication system, the HARQ method comprising:
   transmitting to a receiver a leading subpacket among a plurality of subpackets and first control information;
   controlling allocation of a traffic channel over which a retransmission subpacket is transmitted, according to conditions of wireless resources, upon receipt of a transmission request for the retransmission subpacket from the receiver; and
   during transmission of the retransmission subpacket, determining whether to generate second control information for reception of the retransmission subpacket, and generating the second control information including resource allocation information and transmitting the control information to the receiver when it is determined to generate the second control information.

13. The HARQ method of claim 12, wherein the resource allocation information further includes information indicating additional allocation of the traffic channel.

14. The HARQ method of claim 12, wherein the resource allocation information further includes information indicating allocation change of the traffic channel.

15. The HARQ method of claim 12, wherein the resource allocation information is indicated by a combination of information included in the control information.

16. The HARQ method of claim 12, wherein the control information includes a Media Access Control Identifier (MACID) of the receiver and a channel number of the traffic channel.

17. The HARQ method of claim 12, wherein if a specific set of the subpackets transmitted from the receiver according to the HARQ is defined as a span, a process of the HARQ is performed by transmitting at least one span.

18. The HARQ method of claim 17, wherein control information for reception of the span at the receiver is transmitted together with at least one of the plurality of subpackets.

19. The HARQ method of claim 17, wherein the subpackets transmitted in the span are transmitted in a synchronous manner.

20. The HARQ method of claim 17, wherein a first subpacket among the plurality of subpackets transmitted in the span is transmitted in an asynchronous manner together with the control information for reception of the corresponding span at the receiver, and the remaining subpackets are transmitted in a synchronous manner.

21. A receiver of a mobile communication system supporting Hybrid Automatic Repeat reQuest (HARQ), the receiver comprising:
- a signal receiver for receiving a plurality of subpackets transmitted from a transmitter, and control information for reception of the subpackets;
- a data and control information separator for separating data and the control information of each subpacket received from the signal receiver; and
- a controller receiving from a transmitter a leading subpacket among a plurality of subpackets and first control information, for receiving a retransmission subpacket using the first control information if a second control information for reception of the retransmission subpacket is not received, and for receiving the retransmission subpacket using the second control information if the second control information for reception of the retransmission subpacket is received after sending the request for transmission of the retransmission subpacket.

22. The receiver of claim 21, wherein the data and control information separator stores the first control information, and updates the first control information with the second control information.

23. The receiver of claim 21, wherein the controller further includes a terminal data separator for separating data transmitted to a corresponding receiver from data delivered from the data and control information separator using at least one of the first control information and the second control information.

24. The receiver of claim 21, wherein the controller further controls receiving of the retransmission subpacket using a traffic channel allocated based on the first control information and a traffic channel additionally allocated based on resource addition information, if the control information includes the resource addition information for reception of the retransmission subpacket.

25. The receiver of claim 24, wherein the resource addition information is indicated by a combination of information included in the control information.

26. The receiver of claim 21, wherein the controller further controls receiving of the retransmission subpacket using a traffic channel changed based on resource change information, if the control information includes the resource change information for reception of the retransmission subpacket.

27. The receiver of claim 26, wherein the resource change information is indicated by a combination of information included in the control information.

28. The receiver of claim 21, wherein the controller further controls updating of a data structure related to an interlace for receiving the plurality of subpackets upon receipt of the control information.

29. The receiver of claim 21, wherein if a specific set of the subpackets transmitted from the transmitter according to the HARQ is defined as a span, the controller performs a process of the HARQ by transmitting at least one span.

30. The receiver of claim 29, wherein if control information for reception of the span is transmitted together with at least one of the plurality of subpackets, the controller receives the subpackets belonging to the corresponding span using the control information for reception of the span.

31. The receiver of claim 29, wherein the controller receives the plurality of subpackets transmitted in the span in a synchronous manner using the first control information.

32. The receiver of claim 29, wherein the controller receives a first subpacket among the plurality of subpackets transmitted in the span, in an asynchronous manner according to control information received together with the first subpacket, and receives the remaining subpackets in a synchronous manner using the control information received together.

* * * * *